United States Patent Office 2,886,549
Patented May 12, 1959

2,886,549

COMPOSITIONS OF MATTER COMPRISING AN ALIPHATIC HYDROCARBON SOLVENT HAVING DISSOLVED THEREIN COPOLYMERS OF ESTERS OF POLYMERIZABLE ORGANIC ACIDS

Herbert Bartl, Koln-Stammheim, Germany, assignor to Farbenfabriken Bayer Aktiengesellschaft, Leverkusen, Germany, a corporation of Germany No Drawing. Application February 1, 1955
Serial No. 485,626

Claims priority, application Germany February 18, 1954

8 Claims. (Cl. 260—33.6)

This invention relates to film-forming copolymers of esters of polymerizable organic acids which are soluble in or compatible with benzine.

In the preparation of lacquers, printing inks or impregnating solutions, aliphatic hydrocarbons are preferred to aromatic and halogenated hydrocarbons, esters and ketones for use as solvents, on account of their low toxicity and their scarcely detectable odour. It is frequently only possible to use the solutions in closed rooms when benzines are used as solvents.

The film-forming components present in lacquers, printing inks or impregnating solutions are frequently polymers which dry out from the solutions on evaporation of the solvent to form hard coherent coatings. Such polymers were formerly not considered, however, for the preparation of benzine solutions, since most of the products with film-forming properties which are obtained by polymerization are insoluble in aliphatic hydrocarbons.

It has now been found that polymers which are soluble in or compatible with benzine and which have good film-forming properties are obtained when cycloalkanol esters of polymerizable unsaturated organic acids (first component) are polymerized together with esters of acrylic acid or methacrylic acid and alcohols which contain at least 8 carbon atoms (second component).

The preferred polymerizable organic acids of the first component are acrylic acid, methacrylic acid or other substituted acrylic acids and $\alpha,\beta$-ethylene dicarboxylic acids, such as maleic acid, fumaric acid. The preferred alcoholic component of the first-mentioned esters is a cyclohexyl alcohol such as cyclohexanol, methyl-cyclohexanol, di- or tri-methyl-cyclohexanol, tertiary butyl-cyclohexanol and p-cyclohexyl-cyclohexanol.

It has been found that copolymers which are particularly suitable for the preparation of lacquers are obtained when cyclohexyl esters of acrylic acid or methacrylic acid are used as the first component. The second-mentioned ester, the alcoholic component of which contains at least 8 carbon atoms, may, for example, be a decyl, dodecyl or octadecyl ester of acrylic acid or methacrylic acid, but it is also possible to use a cyclohexyl ester, such as, for example, the p-cyclohexyl-cyclohexyl ester of methacrylic acid or the hydroabietylacrylate or methacrylate. Copolymers derived from esters of unbranched aliphatic alcohols with 10–18 carbon atoms are particularly valuable.

It is obvious that other polymerizable organic compounds, such as, for example, vinyl acetate, styrene, vinyl chloride, acrylonitrile, polymerizable acids or acid amides, methacroleine, maleic acid anhydride, may also be incorporated in the polymers of the invention (third component). Polymerizable vinyl compounds with reactive groups, such as aldehyde, epoxy, carboxy, carboxyl groups, may in this case serve to make the polymers capable of being cross-linked by aftertreatment with polyfunctional compounds such as polyamines, polyhydric alcohols or by mere heating to produce interaction of said reactive groups.

The mixture of monomers to be polymerized preferably consists of 50–90 parts by weight of the first component, 10–50 parts by weight of the second component and, if desired, 1–20 parts by weight of the third component. Whether the polymers are soluble in benzine or compatible with benzine depends on the amount which is used of the esters having alcoholic components with at least 8 carbon atoms. The expression "compatible with benzine" as used herein means that the polymer, when dissolved for example in an aromatic hydrocarbon, may be diluted with appreciable quantities of benzine without the polymer being precipitated.

The polymerization may be carried out in solution, bulk, suspension or emulsion, the monomers being activated in the usual manner by radical formers, such as peroxides, redox systems, azo compounds, ultra-violet light or heat. The molecular weight of the polymers may be adjusted by suitable regulation carried out by means of the conventional polymerization regulators.

The benzine solutions of the polymers give films of good adhesive strength and elasticity. The polymers are distinguished in particular by their outstanding fastness to light. They may also be mixed with other lacquer bases, such as drying oils, various phthalic acid resins or isomerized rubber and plasticizers.

*Example 1*

480 parts by weight of methacrylic acid cyclohexyl ester, 120 parts by weight of methacrylic acid dodecyl ester, 1.5 parts by weight of benzoyl peroxide and 400 parts by weight of a benzine fraction, such as is used as a lacquer solvent, are well mixed in a vessel which can be sealed. The air above the solution is replaced by nitrogen. The polymerization is initially carried out for 24 hours at a temperature of 90° C. and thereafter for a further 48 hours at 120° C. A highly viscous solution is formed which may be diluted as desired with benzine. When the solution is applied to a surface by painting the polymer forms hard, colourless and completely clear films after the solvent has evaporated. The polymer solution may also be mixed with drying oils, and again clear films are formed after the solution has dried.

*Example 2*

70 parts by weight of acrylic acid cyclohexyl ester, 30 parts by weight of methacrylic acid dodecyl ester and 0.2 part by weight of benzoyl peroxide are polymerized for 24 hours at 90° C. and for 48 hours at 120° C. with exclusion of oxygen. The polymer is soluble in benzine and forms colorless hard films. In the same manner, 50 parts by weight of methacrylic acid cyclohexyl ester and 50 parts by weight of methacrylic acid-p-cyclohexyl-cyclohexyl ester are polymerized with 0.2 part by weight of benzoyl peroxide. This product is also soluble in benzine and forms colorless clear films.

*Example 3*

60 parts by weight of methacrylic acid cyclohexyl ester, 20 parts by weight of methacrylic acid-p-cyclohexyl-cyclohexyl ester, 20 parts by weight of methacrylic acid dodecyl ester and 0.3 part by weight of benzoyl peroxide are placed in suspension by intensive stirring in 300 parts by weight of water, in which are dissolved 0.4 part by weight of polyvinyl alcohol, and polymerized for 24 hours at 90° C. Thereafter, while stirring, the suspension is cooled and filtered. The copolymer is obtained in finely divided form. It is soluble in benzine.

*Example 4*

45 parts by weight of dodecylmethacrylate, 50 parts by weight of cyclohexylmethacrylate, 5 parts by weight of maleic acid anhydride, 100 parts by weight of xylene, 1 part by weight of azodiisobutyric acid dinitrile are polymerized for 30 hours at 90° C., whereby more than 90% of the monomers are polymerized. There is obtained a viscous solution, which may be used for the impregnation of textiles after being diluted with 100 parts of benzine having a boiling point of 140–200° C. After the solvent has evaporated there are formed elastic films which may be cross-linked by treating them with trimethylolpropane of about 100° C.

What I claim is:

1. A new composition of matter comprising an aliphatic hydrocarbon solvent having dissolved therein a copolymer of (1) 50–90 parts by weight of a cycloalkanol ester of an acid selected from the group consisting of acrylic acid and methacrylic acid, and (2) 10–50 parts by weight of another ester of an acid selected from the group consisting of acrylic acid and methacrylic acid and a monohydric saturated alcohol containing at least 8 carbon atoms.

2. The composition of claim 1 wherein said solution contains a liquid aromatic hydrocarbon solvent in an amount equal to that of the aliphatic hydrocarbon solvent.

3. Composition of claim 2 wherein said aliphatic hydrocarbon solvent is benzine and said aromatic hydrocarbon solvent is xylene.

4. A process of producing a supported film of a hard, non-tacky resin which comprises spreading the solution of claim 1 on a support, and evaporating the solvent.

5. As a new composition of matter, a benzine solution of a binary copolymer of (1) 50–90 parts by weight of a cyclohexanol ester of an acid selected from the group consisting of acrylic acid and methacrylic acid, and (2) 10–50 parts by weight of another ester of an acid selected from the group consisting of acrylic and methacrylic acid and a saturated monohydric aliphatic alcohol of 10–18 carbon atoms.

6. As a new composition of matter, a benzine solution of a terpolymer of (1) 50–90 parts by weight of a cycloalkanol ester of an acid selected from the group consisting of acrylic acid and methacrylic acid, (2) 10–50 parts by weight of another ester of an acid selected from the group consisting of acrylic and methacrylic acid with a monohydric saturated alcohol containing at least 8 carbon atoms, and (3) 1–20 parts by weight of another monoethylenically unsaturated monomer.

7. Composition of claim 6 wherein the solution contains xylene in an amount equal to that of benzine.

8. A process of producing a supported film of hard, non-tacky resin which comprises spreading the solution of claim 7 on a support, and evaporating the solvent therefrom.

References Cited in the file of this patent

UNITED STATES PATENTS

| | | |
|---|---|---|
| 2,286,251 | Arnold | June 16, 1942 |
| 2,412,475 | Semegen | Dec. 10, 1946 |
| 2,462,400 | Hoover | Feb. 22, 1949 |